United States Patent Office 2,806,072
Patented Sept. 10, 1957

2,806,072

DIMERIZATION PROCESS

Charles A. Cohen, Roselle Park, and Clifford W. Muessig, Breton Woods, N. J., assignors to Esso Research and Engineering Company, a corporation of Delaware No Drawing. Application December 31, 1953, Serial No. 401,691

4 Claims. (Cl. 260—683.15)

This invention relates to a process for the dimerization of a $C_6$ to $C_{12}$ olefin to produce a higher molecular weight olefinic dimer thereof most selectively. More particularly, it relates to the dimerization of a $C_6$ to $C_{12}$ polymer of propylene which may be a narrow polymer fraction of a simple propylene polymerization product but by definition said polymer fraction should contain only at least two but not more than four units of the simpler olefin in the polymer molecule. This specifically excludes the presence or addition of monomeric propylene during the desired dimerization. For the purpose of this invention, a catalyst comprising boron trifluoride ($BF_3$) and an organic alkoxy type ether in the form of a complex is used with additional boron fluoride.

This application is a continuation-in-part of Serial Number 202,429, filed December 22, 1950, now abandoned.

In the practice of this invention, the reactant olefin, which is a $C_6$ to $C_{12}$ propylene polymer, is contacted with a preformed boron fluoride-ether complex as catalyst within the limits of .02 to 0.1 mole of catalyst complex per mole of feed while maintaining an excess of boron trifluoride in the reaction mixture. This excess of boron trifluoride may be maintained up to the limit of its solubility in the reaction mixture at the operating temperature and pressure. The process as described is especially concerned with controlling the dimerization so as to obtain a relatively high conversion of a $C_6$ to $C_{12}$ polymer to a dimeric polymer, and this essentially involves preventing reaction of the $C_6$ to $C_{12}$ polymer with $C_3$ monomer.

In a preferred practice of this invention, a $C_6$ to $C_{12}$ fraction of polypropylene, either in the form of narrow boiling individual fractions or as a somewhat wide boiling fraction, encompassing material boiling within the range $C_6$–$C_{12}$ polypropylene, is dimerized to a $C_{12}$ to $C_{24}$ polypropylene by means of the boron fluoride-ether catalyst complex. Olefins of which the $C_{12}$ to $C_{24}$ polypropylenes are typical examples, find use in the production of synthetic detergents, oil soluble sulfonates, lubricating oil additives, alkyl mercaptans, feeds for the Oxo reaction in which higher aldehydes, acids and alcohols are formed and in other higher alkyl derivatives of aromatics, phenols and the like. The above-mentioned higher molecular weight olefins are especially useful as alkylating agents in reactions involving the use of Friedel-Crafts catalysts. For these purposes, it is highly desirable to use as a starting material olefins having certain molecular weights in the range of $C_{12}$ and above, the $C_{12}$–$C_{24}$ group being particularly desirable from the point of view of solubility and molecular weight. Olefins which are stable under the alkylating conditions employed in the Friedel-Crafts reactions do not occur in nature to any considerable extent nor are they obtainable in any large volume from cracked petroleum products or even the usual polymerization products. To supplement the supplies of these olefins, they have been formed by the dehydration of an alcohol derived from an oil or fat or more recently by the isolation by extended means of olefinic material produced by hydrocarbon synthesis.

Earlier attempts to dimerize the lower propylene polymers to form principally the higher dimers using a variety of catalysts such as boron trifluoride, aluminum chloride, sulfuric acid, stannic chloride, and the like, have failed for a number of reasons, specifically, either on the basis of the poor selective conversions and low yields of the desired dimers obtained or on the nature of the associated undesired products that have to be isolated after the reaction. In the case of aluminum chloride, for example, considerable cyclization takes place and the resulting high molecular weight products show a reduced bromine number for a given molecular weight and are particularly unstable when subjected to further chemical reaction. When boron trifluoride alone is used as a catalyst, some dimerization is obtained but at the same time various trimers, tetramers, etc., are formed, thus making the yields of a desired dimer so poor as to be economically unattractive. In this connection, it should be noted that this invention should be differentiated from those processes which start with the simple olefin per se, such as propylene alone or in admixture with varying proportions of butylene and the simple olefin is polymerized to a mixture of $C_6$ to $C_{12}$ olefins using either phosphoric acid on kieselguhr (U. O. P. type) or boron trifluoride promoted with various agents. With the above catalytic agents, fractionation of the oily products yields a large proportion of material boiling in the $C_6$ and $C_9$ ranges but the yield of material boiling in the range of 180° C. and above ($C_{12}$ and higher olefin), is a maximum of about 10% on the total stabilized material, i. e., after removal of unreacted propylene. The method of the present invention is definitely distinguished from processes in which substantial amounts of olefins or paraffins containing less than 6 carbon atoms per molecule act as polymerizing reactants.

The novel method of the present invention uses a boron trifluoride-alkyl ether complex, which in the case of ethyl ether contains between 45 to 48 wt. percent boron trifluoride and accomplishes the desired dimerization of the low boiling polymers to high boiling polymers with negligible formation of saturated compounds, cyclized materials, or diolefinic materials. The action of the preformed boron trifluoride-ether complex appears to be specific in that under the conditions of operation, breakdown of the propylene polymers to lower boiling material does not occur, neither is the proportion of material boiling above the dimer excessive. The catalyst appears to act specifically for the purpose of producing a dimer of the particular $C_6+$ olefin reactant used as starting material. The same results are not obtained if one attempts to produce the boron trifluoride ether complex in situ by addition first of the ether to the polymer and then adding boron trifluoride, to produce either the complex, or adding the ether separately from the boron trifluoride to the reaction mixture. Some conversion is obtained but the conversions and yields so obtained are distinctly inferior to those obtained when the complex is first prepared outside the reaction zone and then added to the reaction mixture. The action of boron trifluoride not used as a preformed catalyst even when promoted by an ether on a simple olefin of less than six carbon atoms has been shown to be such as to cause no formation of dimers. The reaction seems to be also limited to the use of boron trifluoride complexes with ethers, because other complexes such as boron trifluoride water complex or boron trifluoride-phenol complex give poor yields in comparison with the boron trifluoride-ether complexes.

Ethers which may be used to form the catalyst complexes with boron trifluoride may be symmetrically aliphatic or alkoxy type ($C_nH_{2n+1}\cdot O\cdot C_nH_{2n+1}$) ethers such as dimethyl, diethyl, diisopropyl ether or may be unsymmetric aliphatic ethers such as methyl ethyl ether, methyl tertiary butyl ether, and the like. Other ethers having similar properties may be used.

The production of the ether-boron fluoride catalyst outside the reaction zone is not an intrinsic part of this invention and has been adequately described in the literature and in the patent art. It suffices that the ether-boron fluoride catalyst be made before it is added to the olefin which is to undergo dimerization. It has been found that selective dimerization is obtained when using only small quantities of catalyst complex with the olefin to be polymerized. The range of 1–10 wt. percent of catalyst complex based on the amount of $C_6$–$C_{12}$ polypropylene to be dimerized has been found to be quite satisfactory.

The polypropylene undergoing the controlled dimerization is preferably maintained in the liquid phase by controlling the reaction temperature in the range of from 0° C. to about 100° C. Pressures in the range of from 1 to 10 atmospheres may be employed, although the higher pressures are not generally necessary for successful dimerization.

The controlled dimerization of polypropylene to give particularly $C_{12}$ to $C_{24}$ polymers is advantageously carried out either in batch or continuous operation with controlled regulation of feed rates, temperatures, pressures, and catalyst complex concentration. The catalyst and/or the polypropylene feed may be added intermittently or continuously.

The polymer oil may be recovered in any practical manner as by settling or centrifuging out the catalyst by itself or with an extractant, decomposing the catalyst with water, and separating the polymerized product together with unreacted starting material by decantation from the resulting mixture. The catalyst and its decomposition products will essentially remain in the aqueous layer. The resulting polymer oil may then be subjected to a fractionation during which the appropriate cut is removed in order to recover the relatively pure dimerized product. In this way, the dimer is separated both from unreacted olefins and from a relatively small amount of high-boiling over-polymerized material.

The dimerized polymers have higher chemical and thermal stability than iso-olefin polymers of corresponding molecular weight range made by less selective polymerizations of simple olefins. They also respond differently to treatments with chemical reagents with resulting advantages over the iso-olefin polymers in making various products, such as in preparing wetting agents by sulfonation, in alkylation of aromatic hydrocarbons or phenolic compounds, copolymerization, etc. Considerable promise has been shown for utilization of these polymers in the synthesis of fuel ingredients, lubricating oil additives, detergents, modified resins, plasticizers, cable oils, and other compositions.

The desired dimer products obtained from the controlled polymerization of propylene are indicated to be linear polymers having the basic structural skeleton.

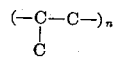

with a random distribution of the double bond, usually in a tertiary position. The methyl ethylene group enclosed by the parentheses represents the recurring structural unit and $n$ is the number of units combined.

The narrow boiling range cuts or fractions of the $C_9$ to $C_{30}$ propylene polymers, such as the separate $C_{12}$ to $C_{24}$ fractions, have specific commercial uses; hence the controlled polymerization is very valuable for obtaining largely any such particular cut desired.

EXAMPLE I

A $C_9$ polypropylene fraction boiling between 130° C. to 135° C. obtained by the close fractionation of a non-selective propylene polymer product made by polymerizing propylene over a phosphoric acid on kieselguhr catalyst at 300 lbs. pressure was mixed at room temperature with a boron fluoride-ethyl ether complex containing 45 wt. percent of boron fluoride in the proportions of 756 gms. of $C_9$ polypropylene to 45 gms. of the boron fluoride ether complex. A slow stream of boron fluoride gas was slowly passed into the reaction mixture to replace boron fluoride which is lost on heating the mixture and the temperature raised to the range of 60° C. to 70° C. and maintained for four hours. At the end of this time, water was added to decompose the catalyst complex, the water catalyst decomposition products were drawn off and the oily layer washed with sodium carbonate to neutralize any residual acidity, and the oily layer was fractionated. The results obtained are shown in column 1 of Table I, which follows, and these results indicate an overall recovery of 90.7%, no cleavage of the $C_9$ polypropylene to form either propylene or propylene polymers boiling below the $C_9$ range and only a small production of material boiling higher than the $C_{18}$ polypropylene corresponding to the $C_9$ dimer. The yield of dimer obtained was equal to 68.5% with a selectivity to the $C_{18}$ dimer of 92%.

EXAMPLE II

A $C_{12}$ polypropylene boiling within the limits of 180° C. to 220° C. obtained from the same non-selective polymer products as the $C_9$ polypropylene used in Example I, was dimerized in a similar manner to the $C_9$ polypropylene. The overall recovery was 95% with a 63% yield of the $C_{24}$ dimer, at a selectivity of 86.5%. Experimental details and inspections on the dimer are shown in column 2 of Table I. In both Examples I and II, a slow stream of boron fluoride was maintained throughout the entire period of the reaction. The amount of boron fluoride added to the reaction zone was in excess of the solubility of boron fluoride in either the $C_9$ polypropylene reaction mixture or the $C_{12}$ polypropylene reaction mixture at the temperature of operation.

Table I lists the experimental conditions and yields for the production of a $C_{18}$ and a $C_{24}$ propylene polymer from the corresponding $C_9$ and $C_{12}$ propylene polymer by this selective dimerization process.

*Table I*

DIMERIZATION OF $C_9$ AND $C_{12}$ POLYPROPYLENE

| Experiment No | 1 | 2 |
|---|---|---|
| Olefin Reactant | $C_9$ Polypropylene | $C_{12}$ Polypropylene. |
| Olefin B. P., ° C | 130–135° C | 180–220° C. |
| Gms. Olefin, Start | 756 | 1,008. |
| Gms. $BF_3$-Ether Complex [a] | 45 | 45. |
| Reaction Time | 4 Hrs | 4 Hrs. |
| Temperature | 60–70° C | 60–70° C. |
| Product Fractionation: | | |
|   Low Boiling | Trace | Trace. |
|   Unreacted Olefin, Gms | 176 | 226. |
|   Close Cut Dimer | 526 | 636. |
|   High Boilers [b] | 46 | 99. |
|   Recovery | 98.7% | 95%. |
| Close Cut Dimer Yield [c] | 68.5% | 63%. |
| Selectivity to Dimer | 92% | 86.5%. |
| Dimer Inspections | $C_{18}=$ | $C_{24}=$. |
| Boiling Point, ° C | 275–295° C | 340–370° C. |
| Density 60° F./60° F | 0.791 | 0.816. |
| Bromine No., Centigrams/gm | 65.8 | 45.9. |
| Bromine No., Theor | 63.9 | 47.7. |

[a] Boron fluoride gas bubbled in excess through reaction mixture during entire reaction period.
[b] Comprising some dimer.
[c] Conservative yield which can be increased by taking a wider cut or recovering more dimer from the lower and higher boiling fractions.

This process of this invention is to be distinguished from the prior art as exemplified by the invention of Carl S. Carlson et al., U. S. 2,588,358, wherein a similar catalyst is used for the polymerization of monomeric propylene to higher propylene polymers.

Examples 1 and 2 cited in the patent of Carlson et al. show yields of liquid polymers having a wide range of boiling points encompassing $C_9$ to $C_{24}+$ carbon atoms, but the selectivity to the $C_{18}$ polymers at conversion levels of approximately 90% is equal to only 28% and conversion to the $C_{24}+$ polymer is only equal to 8% compared to selectivity respectively of 92 and 86.5% for the present invention in which monomeric propylene is not reacted with the $C_6$ to $C_{12}$ polymer which is dimerized.

What is claimed is:

1. The process for selectively producing principally a propylene polymer in the range of $C_{12}$ to $C_{24}$ which comprises dimerizing a $C_6$ to $C_{12}$ propylene polymer substantially free of olefins containing less than six carbon atoms at temperatures between 0° C. to 100° C. with a preformed boron fluoride-ether catalyst complex and an excess of boron fluoride.

2. The process for selectively producing $C_{12}$ to $C_{24}$ polypropylene polymers, which comprises dimerizing propylene polymers boiling within the range of $C_6$ to $C_{12}$ olefin polymers substantially free of lower propylene monomer at temperatures of 60° C. to 70° C. heterogeneously mixed with a preformed boron fluoride-ethyl ether catalyst complex in an amount of about 4 to 6 percent by weight of catalyst complex based on the amount of olefin polymers used, and supplying an excess of boron fluoride to the resulting mixture.

3. The process for producing selectively a $C_{18}$ fraction of 275°–295° C. boiling range which comprises selectively dimerizing a polypropylene fraction substantially consisting of $C_9$ olefins at 60° C. to 70° C. with a preformed boron fluoride-ethyl ether complex and additional boron fluoride, whereby there is obtained principally $C_{18}$ polypropylene.

4. The process for producing a $C_{24}$ fraction of 340°–370° C. boiling range which comprises selectively dimerizing a polypropylene fraction substantially consisting of $C_{12}$ olefins at 60° C. to 70° C. with a preformed boron fluoride-ethyl ether complex and additional boron fluoride, whereby there is obtained principally $C_{24}$ polypropylene.

References Cited in the file of this patent

UNITED STATES PATENTS

| | | |
|---|---|---|
| 2,588,358 | Carlson et al. | Mar. 11, 1952 |
| 2,588,425 | Stevens et al. | Mar. 11, 1952 |